United States Patent [19]
Schlegel et al.

[11] Patent Number: 6,010,115
[45] Date of Patent: *Jan. 4, 2000

[54] CAVITYLESS GATE VALVE

[75] Inventors: David J. Schlegel, Vancouver, Wash.; Edward H. Fye, Portland, Oreg.

[73] Assignee: Familian Northwest, Inc., Portland, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/948,711

[22] Filed: Oct. 10, 1997

[51] Int. Cl.$^7$ ........................................ F16K 3/02
[52] U.S. Cl. ............................................ 251/327; 251/328
[58] Field of Search ...................... 251/327, 328

[56] References Cited

U.S. PATENT DOCUMENTS

| | | | |
|---|---|---|---|
| 3,076,631 | 2/1963 | Grove | 251/358 X |
| 4,201,365 | 5/1980 | Paptzun et al. | 251/328 |
| 4,221,307 | 9/1980 | Peterson | 251/327 X |
| 4,377,274 | 3/1983 | Mayhew, Jr. | 251/327 |
| 4,765,361 | 8/1988 | Clifford | 251/327 X |
| 5,020,776 | 6/1991 | Owens et al. | 251/327 |
| 5,330,158 | 7/1994 | Ellich et al. | 251/327 |

*Primary Examiner*—John Fox
*Attorney, Agent, or Firm*—Ipsolon LLP

[57] ABSTRACT

A gate valve has a pair of spaced-apart body halves with a slot positioned between them. The slot extends transverse, preferably perpendicular, to a fluid passageway. In one embodiment, an O-port gate is moveable within the slot and includes a pair of opposed major surfaces. The O-port gate includes a fluid impermeable portion and an aperture. A pair of opposed, plastic interior plates face each other and contact the opposed major surfaces of the O-port gate, thereby forming a cavityless gate valve. The plastic interior plates, formed of high-density polyethylene (HDPE), for example, have a lubricity that prevents the gate from seizing to them.

16 Claims, 5 Drawing Sheets

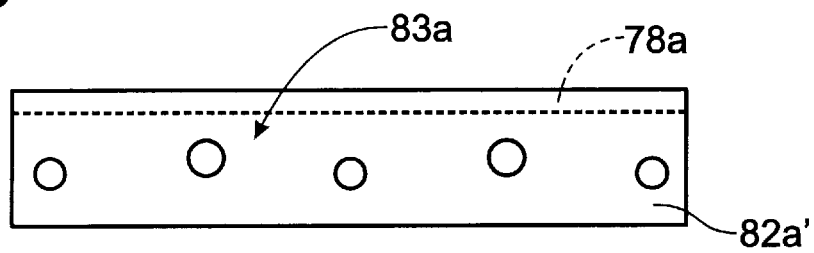
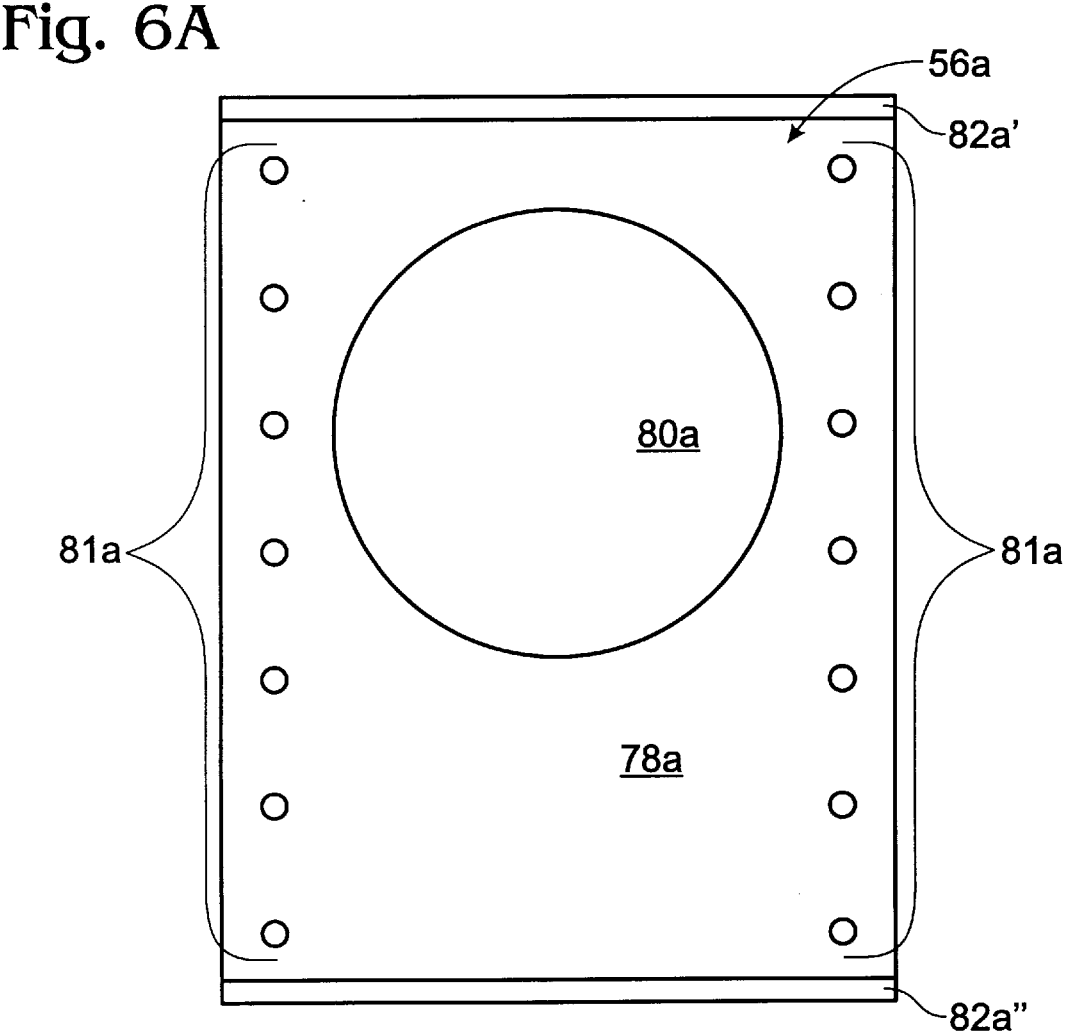

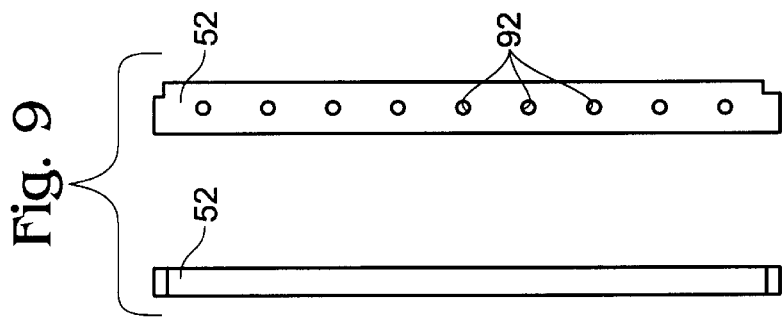
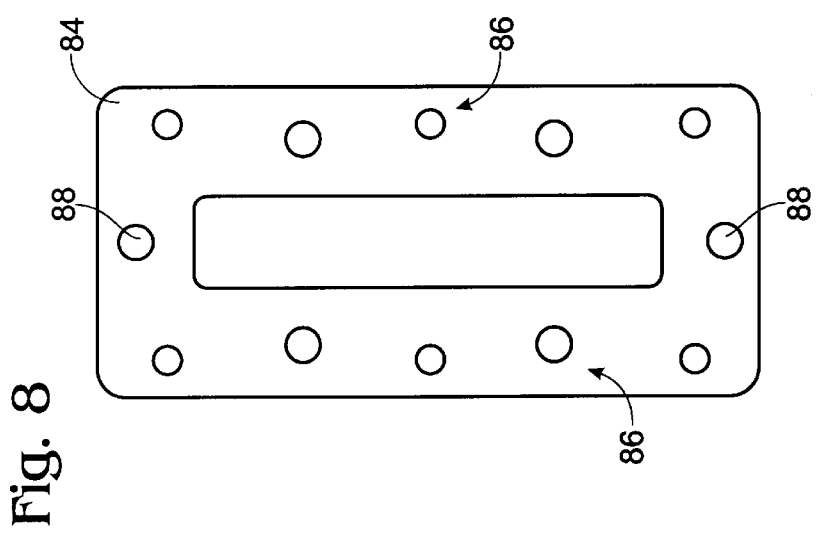
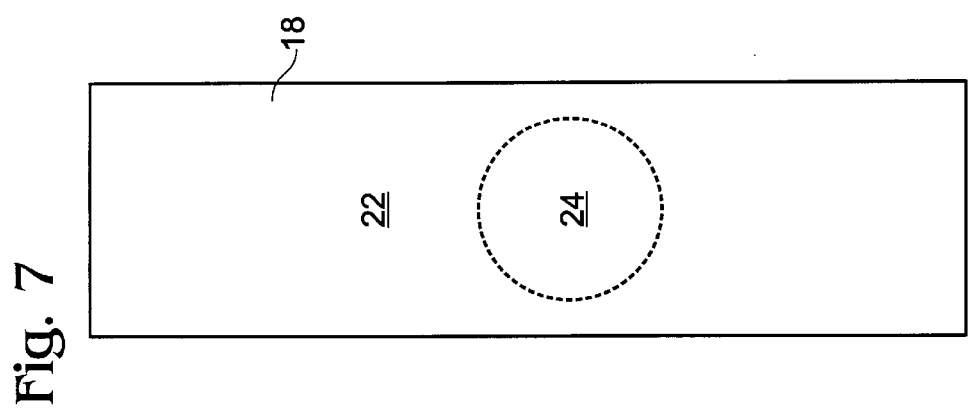

CAVITYLESS GATE VALVE

FIELD OF THE INVENTION

The present invention relates to a gate valve having a gate that moves within a slot in a main body structure to control a fluid passageway and, in particular, to such a gate valve in which the gate fills the slot to provide a cavityless gate valve.

BACKGROUND AND SUMMARY OF THE INVENTION

Gate valves are used to control the flow of various fluids carried inside conduits or pipes. A gate valve typically includes a main body structure with a fluid passageway positioned between and coupling a pair of axially aligned conduits that are bolted to opposite sides of the main body structure. A flat, fluid-impermeable gate is slidable through a slot in the main body structure to selectively open or close the passageway and hence the valve. In some gate valves the absence of the gate or a portion of it from the passageway opens the gate valve. In other gate valves, referred to as O-port gate valves, the gate includes a fluid impermeable portion and an apertured portion or "O-port." These valves are opened when the O-port, or a portion of it, is aligned with the fluid passageway.

Gate valves that are used to control the flow of fluids typically include a separate annular gate seal that is positioned between the gate and the main body structure to prevent the fluid from leaking. In an O-port gate valve, the annular gate seals remain in contact with the gate; either the impermeable portion or the portion surrounding the O-port. In other gate valves, the sleeve units compressibly engage each other when the valve is open and engage opposite sides of the gate when the valve is closed. Despite the use of annular gate seals, fluid leakage is a common problem with gate valves and can occur from the valve to the surrounding environment, across a closed valve, or from the passageway into interior portions of the valve.

Annular gate seals have been made from many different materials and in many different configurations but generally suffer from common disadvantages. Annular gate seals typically bear against the gate or each other under significant pressure. This pressure is necessary to maintain a seal, whether the gate valve is open or closed. A consequence of this pressure is that the seal is subjected to significant shearing forces as the gate is moved to open or close the valve. The shearing forces can damage or displace the seal, resulting in leakage.

Gate valves are commonly used in industrial applications (e.g., mining, wood pulp processing, paper manufacturing) in which the fluids or slurries carried by the valve can be particularly abrasive or chemically harsh due to temperature, pressure, or acidity. In addition, some fluids and the solids carried by some fluids (e.g., in slurries) can clog, coat, or damage many conventional seals. Another complication with conventional gate valves is that the slot through which the gate moves to open or close the gate is deeper than the gate is thick. This forms a cavity that prevents the gate from seizing to the interior surfaces of the valve. In many industrial environments, material that leaks into the valve body can harden to a solid mass within the cavity, making it extremely difficult or impossible to operate the valve.

Furthermore, the annular gate seals of conventional seals typically are molded and require a different mold for each size of valve. (Gate valves are sized according to the diameter of the conduit connected to the valve.) In manufacturing valves in a range of sizes, the mold for each size of seal can pose a significant manufacturing expense. The expense can be prohibitive if the volume of valves and seals in a particular size is relatively low and insufficient to recover the cost of the molds.

The present invention includes a gate valve having a pair of spaced-apart body halves with a slot positioned between them. The slot extends transverse, preferably perpendicular, to a fluid passageway. In one embodiment, an O-port gate is moveable within the slot and includes a pair of opposed major surfaces. The O-port gate includes a fluid impermeable portion and an apertured portion. A pair of opposed, plastic interior plates face each other and contact the opposed major surfaces of the O-port gate to form a cavityless gate valve.

The contact between the plastic interior plates and the major surfaces of the O-port gate form a sheet seal that effectively prevents leakage between the main body structure and the gate, thereby eliminating the need for a conventional annular gate seal. An advantage of the sheet seal is that it does not require the significant sealing pressures needed for localized annular gate seals, thereby eliminating the shearing forces that are so damaging to seals. In one embodiment, the sheet seal extends over substantially the entire slot. The plastic interior plates, formed of high-density polyethylene (HDPE), for example, have a lubricity that prevents the gate from seizing to them.

Another advantage of the plastic interior plates is that they eliminate the cavity of conventional gate valves. Elimination of the cavity means that leakage of certain industrial materials cannot fill a cavity, harden, and block operation of the valve. This provides a significant improvement in valve reliability in many industrial environments. Finally, elimination of the annular gate seal eliminates the cost of forming a seal mold for each size of valve.

Additional objects and advantages of the present invention will be apparent from the detailed description of the preferred embodiment thereof, which proceeds with reference to the accompanying drawings.

BRIEF DESCRIPTION OF THE DRAWINGS

FIGS. 6A and 6B are respective front elevation and plan views of a metal exterior plate of the gate valve of FIG. 1.

FIG. 7 is a front elevation of an O-port gate of the gate valve of FIG. 1.

FIG. 8 is a plan view of an inner bracket of the gate valve of FIG. 1.

FIG. 9 is a front elevation of a spacer of the gate valve of FIG. 1.

DETAILED DESCRIPTION OF PREFERRED EMBODIMENT

Figure 2:
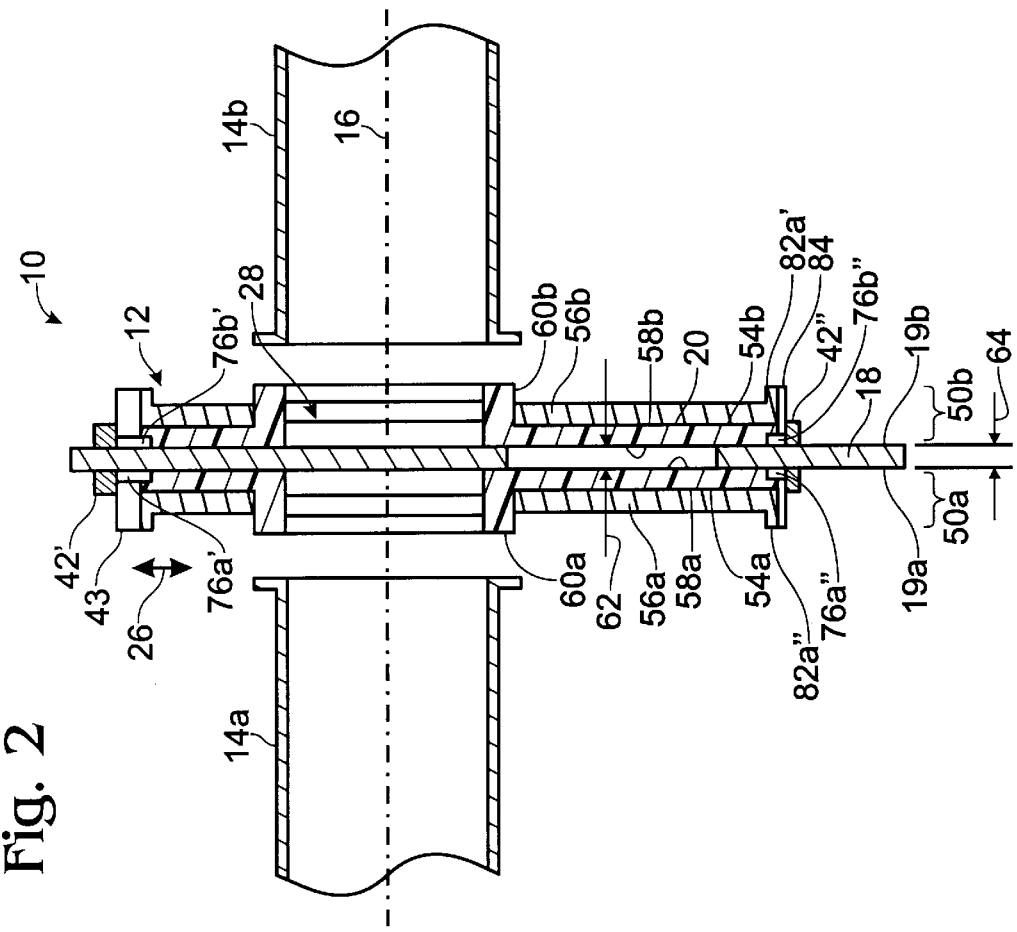
FIG. 2 is a partly exploded, fragmentary side sectional view showing a main body section and gate of the valve of FIG. 1.
Figure 1:
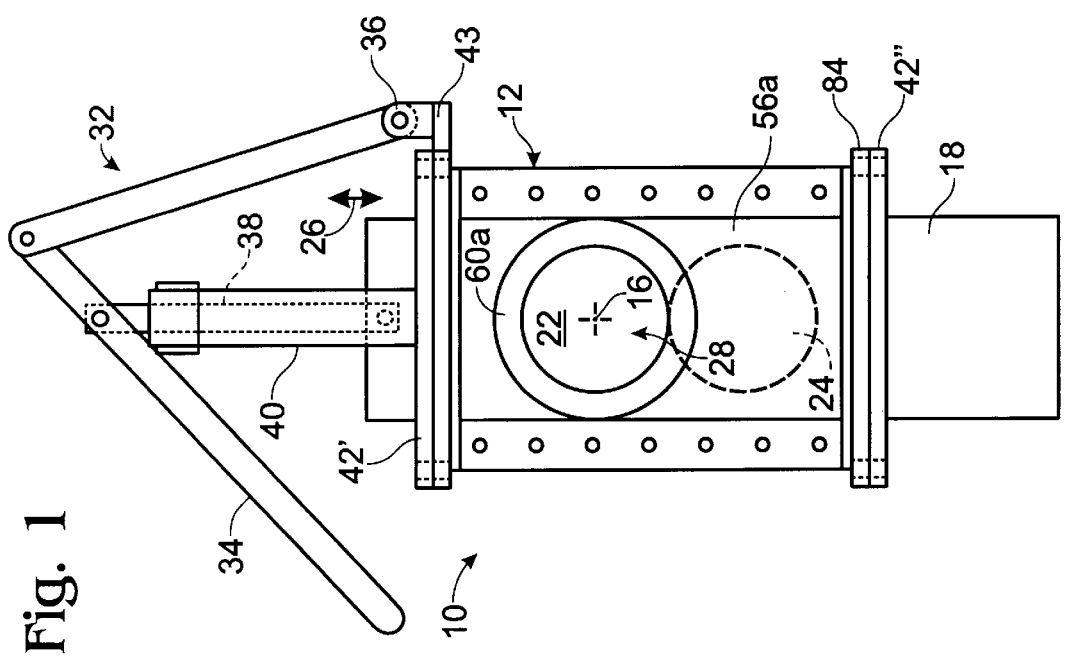
FIG. 1 is a front elevation of a gate valve according to the present invention.
Figure 4:
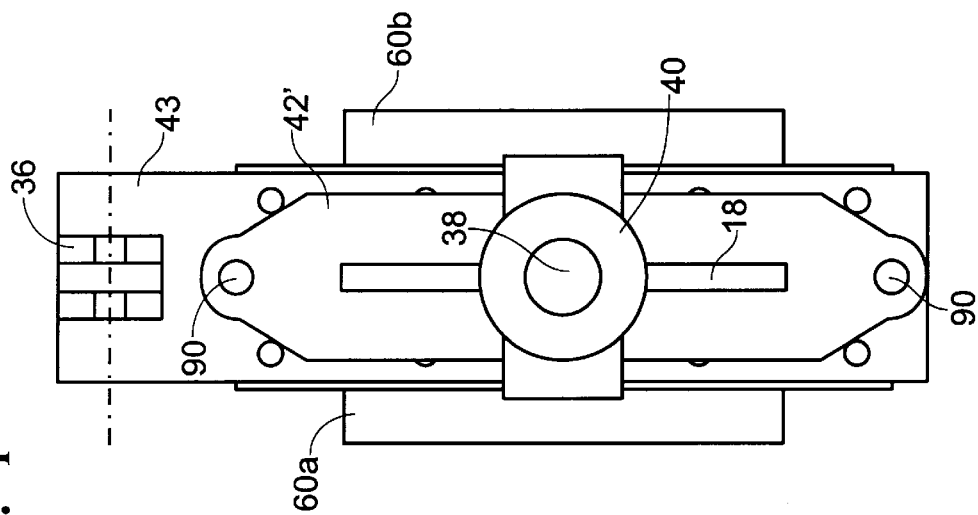
FIG. 4 is a plan view of the gate valve of FIG. 1 with the lever control mechanism omitted for clarity.
Figure 3:
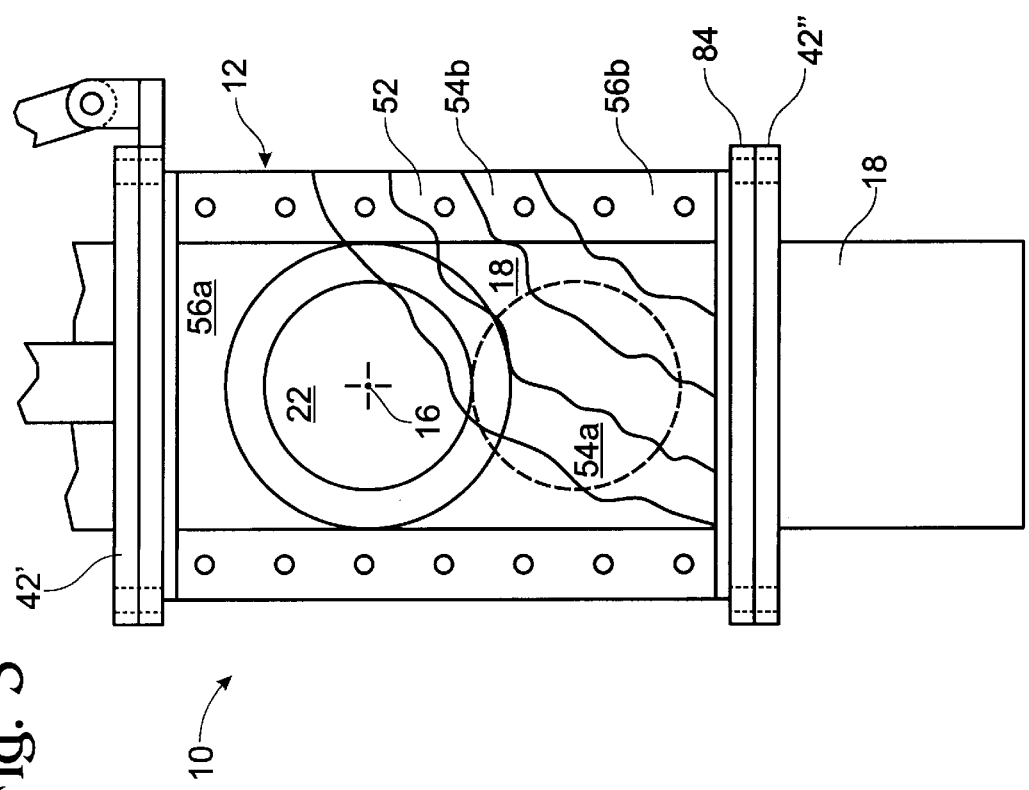
FIG. 3 is a partial front elevation of the gate valve of FIG. 1.

FIGS. 1–4 show a bi-directional O-port gate valve 10 having a main body structure 12 that is positioned between a pair of axially-aligned conduits 14a and 14b for carrying a fluid or slurry along an axis 16. A flat gate 18 with opposed major surfaces 19a and 19b is positioned within a slot 20 passing through main body structure 12. Gate 18 includes a fluid impermeable portion 22 and an adjacent O-port or aperture 24. Gate 18 is slidable within slot 20 in directions 26 to selectively occlude a fluid passageway 28 through valve 10 and between conduits 14a and 14b. Positioning impermeable portion 22 of gate 18 across passageway 28 occludes the passageway and closes valve 10. Positioning O-port or aperture 24 within passageway 28 opens the passageway and valve 10. Directions 26 are transverse, preferably perpendicular to, axis 16.

Movement of gate 18 through slot 20 may be controlled by any conventional gate valve control mechanism. In the illustrated embodiment, a lever control mechanism 32 includes a hand lever 34 pivotally coupled to a lever anchor 36 and one end of a gate stem 38. Gate stem 38 slides through a control mechanism bracket 40 mounted over a packing gland 42' and a top plate 43 on main body structure 12. The opposite end of stem 38 is coupled to gate 18 and transfers to it the opening or closing motion exerted on lever 34. It will be appreciated, however, that movement of gate 18 through slot 20 may be controlled by other conventional mechanisms such as, for example, a hand wheel, chain, or bevel gear, whether controlled manually or by electric, hydraulic, or pneumatic operation.

Main body structure 12 includes a pair of opposed, substantially identical body halves 50a and 50b that are bolted or welded together with a pair of flat spacers or shims 52 (only one shown in FIG. 3) positioned between the side margins thereof. Body halves 50a and 50b include spaced-apart, opposed interior plates 54a and 54b, respectively, that include interior surfaces 58a and 58b of non-metallic, hardened polymeric or plastic material. Suitable plastic materials include, for example, high density polyethylene (HDPE), medium density polyethylene (MDPE), polyvinylidene fluoride (PVDF), polypropylene (PP), polyvinylchloride (PVC), chlorinated polyvinylchloride (CPCV), or polytetrafluoroethylene (commonly known as teflon). In the illustrated embodiment, plates 54a and 54b are formed entirely of the plastic material.

Plastic interior plates 54a and 54b are positioned between a pair of metal (e.g., steel) exterior plates 56a and 56b that provide structural rigidity to main body structure 12 and encircle stubs or pups 60a and 60b (or alternatively flanges) for coupling to conduits 14a and 14b. It will be appreciated, however, that gate valve 10 could alternatively be manufactured without metal exterior plates 56a and 56b. In this implementation, HDPE is a desireable material because it is both moldable and weldable. The ability to weld the material simplifies manufacturing by allowing plastic (HDPE) stubs or pups 60a and 60b to be attached to plastic plates 54a and 54b, rather than formed as a unitary construction as shown.

Plastic interior plates 54a and 54b line slot 20 with opposed major surfaces 58a and 58b that contact or engage major surfaces 19a and 19b of gate 18. The contact or engagement between the major surfaces of gate 18 and interior plates 54a and 54b forms a sheet seal for sealing gate 18 within valve 10. The sheet seal is distinct in structure and function from a conventional annular gate seal that seals a gate only where the fluid passageway passes through the valve. A conventional annular gate seal includes an annular ring that encircles the fluid passageway and provides localized sealing. The slot within a conventional gate valve is commonly a generally open (i.e., non-sealing) cavity between the conventional annular gate seal and boundary seals (e.g., packing material) at the edges of the valve.

The sheet seal provided by interior surfaces 58a and 58b of plastic interior plates 54a and 54b may be characterized in several ways. The sheet seal is formed by a flat interior surface of the gate valve rather than a localized annular ring. The sheet seal typically is radially asymmetric, corresponding generally to the dimensions and configuration of slot 20 rather than the periphery of passageway 28. The sheet seal typically extends over a major portion of slot 20, extending beyond the localized region immediately adjacent to the periphery of passageway 28. In the illustrated embodiment, the sheet seal extends over substantially all of slot 20.

The sheet seal provided by interior surfaces 58a and 58b of plastic interior plates 54a and 54b encapsulates gate 18 and eliminates the cavity of conventional gate valves. Some fluid materials carried through the valve can solidify within such conventional cavities and block movement of the gate. The sheet seal prevents such blockages from occurring. In addition, the sheet seal is relatively inexpensive to manufacture in comparison to conventional annular gate seals. The annular gate seal for each size of valve is typically molded from a separate mold. As a consequence, such seals are relatively expensive in low manufacturing volumes because of the relatively high incremental costs of the molds. The sheet seal of valve 10 eliminates such expenses.

Spacers 52 are formed of a rigid material, such as stainless steel or mild steel, that is selected according to the temperature and chemical characteristics of the fluid or slurry carried by valve 10. Spacers 52 separate interior surfaces 58a and 58b of interior plates 54a and 54b to form slot 20 through which gate 18 moves to selectively open or close gate valve 10. Spacers 52 form slot 20 with a thickness 62 that is 0.003–0.005 inch (0.076–0.127 mm) greater than the thickness 64 of gate 18. As a result, gate valve 10 can be manufactured with gates 18 that are formed of different materials (e.g., stainless steel or HDPE) having different thicknesses (e.g., ¼" or ¾") simply by installing spacers 52 of different thicknesses. This simplifies the manufacture of gate valves suited for different applications.

Such close tolerances provide a sheet seal between gate 18 and interior plates 54a and 54b. In addition, the lubricity of the plastic materials from which interior plates 54a and 54b are formed or that are on the interior surfaces 58a and 58b allows gate 18 to slide therebetween. Interior plates 54a and 54b having metallic facing surfaces would seize or bind against a metallic gate. Instead, the sheet seal of the present invention has a lower drag coefficient (i.e., friction) resisting motion of gate 18 than does a conventional annular gate seal. As a result, large diameter (e.g., up to at least 24") gate valves can be manufactured and operated with minimal resistance. For example, the sheet seal allows use of simple, low-cost lever control mechanisms on valves of up to 12". Conventional annular gate seals exert such pressure against a gate that lever control mechanisms are suitable only on valves of up to about 6".

Figure 5B:
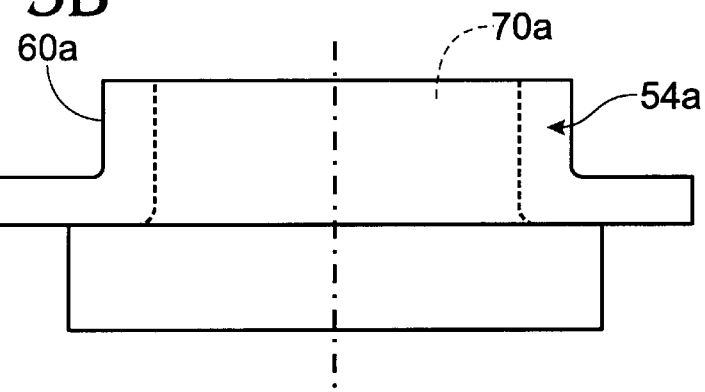
FIGS. 5A and 5B are respective front elevation and plan views of a plastic interior plate of the gate valve of FIG. 1.
Figure 5A:
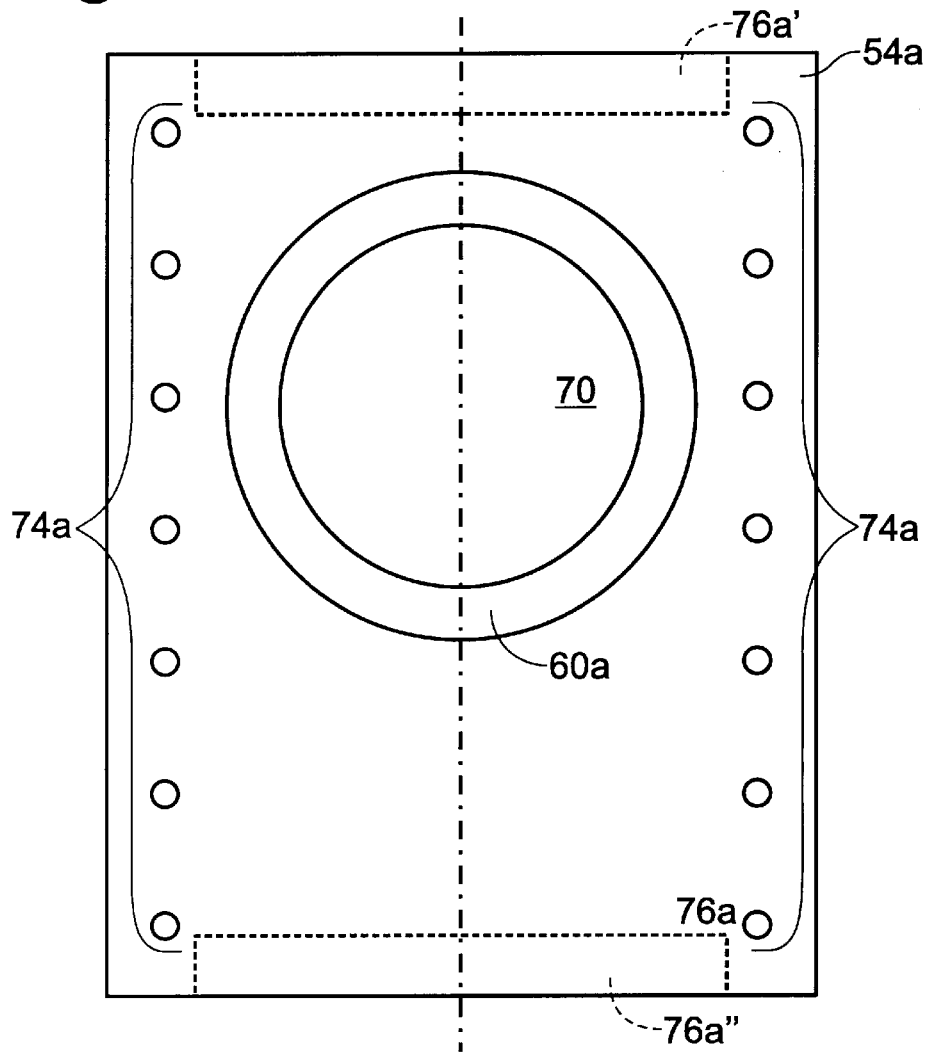

FIGS. 5A and 5B are respective front elevation and plan views of plastic interior plate 54a. Plate 54a is a mirror image of plastic interior plate 54b, so the following description of the former is similarly applicable to the latter. Plate 54a includes a passageway aperture 70a encircled by stub or pup 60a and multiple bolt apertures 74a arranged along each side. Plate 54a and pup 60a may be of unitary construction as shown or, alternatively, pup 60a may be a separate tube welded to plate 54a. Bolts (not shown) extend through bolt apertures 74a for assembling gate valve 10. Plate 54a also includes partial recesses 76a' and 76a" at opposite ends between bolt apertures 74a. Partial recesses 76a' and 76a" extend into the gate-facing interior surface of plate 54a and function to contain a packing seal (not shown) that seals against gate 18. It will be appreciated, however, that even with recesses 76a' and 76a", plates 54a and 54b form with gate 18 sheet seals that extend over substantially all of slot 20.

FIGS. 6A and 6B are respective front elevation and plan views of metal exterior plate 56a, which is a mirror image of metal exterior plate 56b. The following description of plate 56a is similarly applicable to plate 56b. Plate 56a includes a main body 78a with a passageway aperture 80a and multiple bolt apertures 81 a arranged along each side. Bolts (not shown) extend through bolt apertures 81 a for assembling gate valve 10. Bolt apertures 81 a align with apertures 74a so that a single bolt extends through each group of aligned apertures. A pair of flanges 82a' and 82a" extend transverse (e.g., perpendicular) to and may be of unitary construction with main body 78a. Flanges 82a' and 82a" are substantially the same and include multiple bolt apertures 83a.

FIG. 7 is a front elevation of an O-port gate 18 showing aperture 24 and fluid impermeable portion 22. Aperture 24 may be formed with a diameter greater than the diameters of passageway apertures 70a and 70b (i.e., valve passageway 28) to prevent the periphery of aperture 24 from being worn by the flow of abrasive materials through valve 10. FIG. 8 is a plan view of an inner bracket 84 positioned on main body structure 12 inside a lower packing gland 42". Inner bracket 84 includes multiple bolt apertures 86 through which bolts extend to bolt apertures 83 in flanges 82a" and 82b". A pair of bolt apertures 88 align with bolt apertures 90 on packing gland 42" to bolt the latter to the former. Top plate 43 is similar to inner bracket 84, with the addition of support for lever anchor 36, so that top plate 43 is bolted to packing gland 42' and flanges 82a' and 82a" similarly. FIG. 9 is a front elevation of a spacer 52, which includes bolt apertures 92 that align with apertures 74 and 81 to receive the same bolts.

It will be obvious to those having skill in the art that many changes may be made in the above-described details of a preferred embodiment of the present invention without departing from the underlying principles thereof. The scope of the invention should, therefore, be determined only by the following claims.

What is claimed is:

1. In a gate valve with a pair of spaced-apart body halves having positioned therebetween a slot that extends transverse to a fluid passageway, an O-port gate having a gate thickness and a fluid impermeable portion and an adjacent fluid aperture, the gate being moveable within the slot and including a pair of opposed major surfaces, the improvement comprising:

a pair of opposed, generally rigid plastic plates having plastic interior surfaces facing each other and forming sheet seals on the opposed major surfaces of the gate;

openings at first and second opposed ends of the slot, the gate being moveable through the openings to extend out from between opposite sides of the spaced-apart body halves; and a spacer positioned between the main body halves to maintain the interior surfaces spaced apart by more than the gate thickness, but no more than about 0.005 inch more than the gate thickness.

2. The gate valve of claim 1 in which the sheet seal extends over substantially all of the slot.

3. The gate valve of claim 1 further comprising:

a pair of metal exterior surfaces between which the plastic interior surfaces are positioned; and a pair of pups or flanges extending from the metal exterior surfaces for coupling to conduits.

4. The gate valve of claim 3 in which the metal exterior surfaces are of opposed, metal exterior plates.

5. The gate valve of claim 1 in which the plastic interior plates include plastic exterior surfaces that have plastic pups or flanges for coupling to conduits.

6. The gate valve of claim 1 in which the plastic interior plates include plastic exterior surfaces that have plastic pups or flanges welded thereon for coupling to conduits.

7. The gate valve of claim 1 in which the gate has a gate thickness and the gate valve further comprises a spacer positioned between the main body halves to maintain the interior surface in spaced apart relation, the spacer having a spacer thickness corresponding to the gate thickness.

8. The gate valve of claim 1 in which the plastic interior surfaces are of high density polyethylene (HDPE).

9. The gate valve of claim 1 in which the plastic interior surfaces are of one of medium density polyethylene (MDPE), polyvinylidene fluoride (PVDF), polypropylene (PP), polyvinylchloride (PVC), chlorinated polyvinylchloride (CPCV), or polytetrafluoroethylene.

10. The gate valve of claim 1 further including generally rigid plastic pups or flanges extending from the plastic plates for coupling to conduits of a selected diameter.

11. A gate valve, comprising:

a pair of spaced-apart body halves having positioned therebetween a slot that extends transverse to a fluid passageway;

an O-port gate that has a gate thickness and is moveable within the slot and includes a pair of opposed major surfaces;

a pair of opposed, generally rigid plastic plates having plastic interior plates facing each other and forming sheet seals on the opposed major surfaces of the gate;

openings at first and second opposed ends of the slot, the gate being moveable through the openings to extend out from between opposite sides of the spaced-apart body halves; and a spacer positioned between the main body halves to maintain the interior plates spaced apart by more than the gate thickness, but no more than 0.005 inch more than the gate thickness.

12. The gate valve of claim 11 in which the sheet seal extends over substantially all of the slot.

13. The gate valve of claim 11 further comprising a pair of metal exterior plates between which the plastic interior plates are positioned and a pair of flanges extending from the metal exterior plates for coupling to conduits.

14. The gate valve of claim 11 further comprising a pair of metal exterior plates between which the plastic interior plates are positioned and in which the plastic interior plates include plastic exterior surfaces and a pair of plastic pups or flanges extending beyond the metal exterior plates for coupling to conduits.

15. The gate valve of claim 14 in which the pups or flanges are plastic and are welded to the plastic interior plates.

16. The gate valve of claim 11 in which the plastic interior plates are of high density polyethylene (HDPE).

* * * * *